Figure 1:
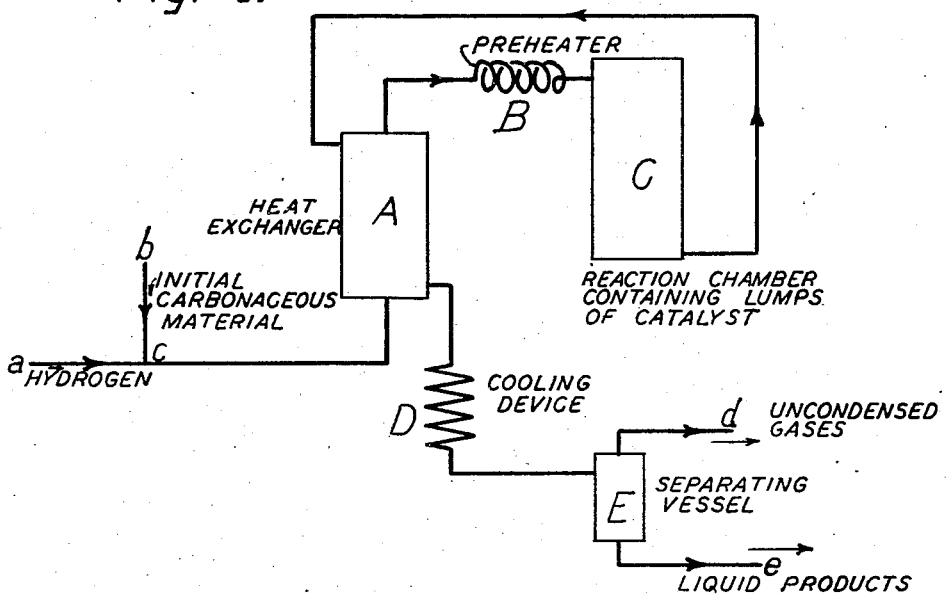

May 28, 1935. P. HEROLD ET AL 2,002,997

DESTRUCTIVE HYDROGENATION OF CARBONACEOUS MATERIAL

Filed Oct. 23, 1931

INVENTORS
PAUL HEROLD
HERMANN KAUFMANN.
BY *Hauff + Warland*
ATTORNEYS.

Patented May 28, 1935

2,002,997

UNITED STATES PATENT OFFICE 2,002,997

DESTRUCTIVE HYDROGENATION OF CARBONACEOUS MATERIAL

Paul Herold and Hermann Kaufmann, Leuna, Germany, assignors to Standard-I. G. Company, Linden, N. J., a corporation of Delaware Application October 23, 1931, Serial No. 570,760
In Germany October 31, 1930

6 Claims. (Cl. 196—53)

The present invention relates to improvements in the destructive hydrogenation of carbonaceous materials.

In the conversion of distillable carbonaceous materials, such as coals of all varieties, tars, mineral oils, their distillation and conversion products and other hydrocarbon products into hydrocarbons of the nature of benzines by catalytic destructive hydrogenation at temperatures ranging between 300° and 700° C. and under a pressure of at least 20 atmospheres, preferably more than 50 atmospheres, it is already known that those catalysts are especially suitable, which contain the heavy metals of the 6th group of the periodic system, either alone, in the form of oxides, salts, such as carbonates, or sulphides and the like, if desired in admixture with each other or with other substances, as for example zinc oxide or magnesium oxide.

Among these substances, molybdenum, tungsten and the compounds thereof have proved to be especially active catalyst components.

It has now been found that the said reaction is effected with particular advantage in the presence of isopoly acids of molybdenum or tungsten or their salts or of metallic complex acids of these metals or salts thereof.

Isopoly acids, as is known, are acids in which the oxygen atoms of an acid containing combined oxygen are substituted by radicles of the same acid, as defined by Weinland in "Einföhrung in die Chemie der Komplex-Verbindungen", 1924, page 450, or in Remy's "Lehrbuch der Anorganischen Chemie", 1932, second volume, page 131. These isopoly acids are distinguished from the so called heteropoly acids in which the oxygen atoms of an acid containing combined oxygen are substituted by radicles of at least one different acid, as explained on page 130 of the said book by Remy and on pages 433 et seq. of the said book by Weinland and which therefore can be said to contain at least two different acid radicles of which one is usually present in excess over the other.

Metallic complex acids constitute a particular class of heteropoly acids in which the atom combined with the acid radicles substituting the oxygen of the simple acid, which atom is called the central atom, is not a non-metal, as in the case of silicomolybdic acid or phosphomolybdic acid, but a metal. In this case the central atom may also be the same as the metal contained in the acid radicles combined with said central atom, provided this central metallic atom has another degree of oxidation than the metal atoms contained in the other acid radicles.

The complex compounds employed in accordance with the present invention differ from the usual complex compounds, as for example zinc molybdo-cyanide, Zn₂Mo(CN)₈, in that in each molecule of the complex compounds more than one molybdenum or tungsten atom or at least one of each molybdenum and tungsten atom, together with other atoms, is present in a certain grouping.

Among the isopoly acids of molybdenum or tungsten or their salts may be specifically mentioned:

(I) Ammonium decamolybdate
$(NH_4)_2Mo_{10}O_{31} \cdot 3H_2O$, (II) Ammonium pentadecamolybdate
$3(NH_3) \cdot 15MoO_3 \cdot 6H_2O$, (III) The polymolybdates or polymolybdic acids, the full constitution of which has not been ascertained, obtained by the partial or complete removal of ammonia by heating ammonium para-molybdate in the absence of reducing gases or normal ammonium molybdate, for example to a temperature of 400° C., (IV) Ammonium meta-tungstate obtained by heating ammonium para-tungstate to between 250° and 300° C.

Examples of the metallic complex acids molybdenum or tungsten salts thereof are:—

(I) Ammonium hexamolybdochromite, (II) Ammonium hexamolybdoaluminate, (III) The free complex acids obtained by heating the said ammonium hexamolybdochromite or ammonium hexamolybdoaluminate to about 400° C.

Complex compounds of a higher order of the aforesaid nature and methods for their production are for example described in Abegg-Auerbach "Handbuch der Anorganischen Chemie", Leipzig 1921, vol. 4, part 1, second half, pages 644, 831, and 1048 and in "Berichte der Deutschen Chemischen Gesellschaft", vol. 34, page 158.

In order to obtain the catalysts in a suitable form it is very advantageous to mix them with other non-reducible substances. By "non-reducible substances" we understand oxides and salts of metals which are not substantially altered by the attack of hydrogen up to a temperature of 450° C.

As examples of such non-reducible substances may be mentioned alumina, chromic oxide, kaolin and the phosphates of zinc, magnesium or aluminium. The said admixtures, which are usually employed in a finely pulverulent state, serve more particularly as binding agents to increase the solidity of the catalyst component. Between about 10 and 50 per cent by weight of the said admixtures are advantageously contained in the resulting catalyst mass. It has been found that, in order to maintain the complex structure it is necessary either to avoid all additions of a basic nature or so to regulate the amounts of such additions that in the final mixture the acid components are stoichiometrically considerably predominant compared with the basic components. Among the said basic components are included not only the oxides, carbonates and other salts of volatile acids of the alkaline and alkaline earth metals and magnesium, but also those of zinc, manganese and the like, while those of aluminium and the rare earth metals and of chromium are without injurious effect.

It is preferable to use the catalysts according to the present invention in a state free from readily reducible compounds and from metals forming such compounds, as for example from iron and its compounds. By "readily reducible compounds" we understand such as are reduced by hydrogen to the metals, or a lower oxidation stage at a temperature up to 450° C., more particularly up to 400° C.

In the process according to the present invention the hydrogen is employed in excess, that is to say the space filled by hydrogen is greater, preferably more than 1.5 times greater, than that filled by the vaporized carbonaceous materials. The particular amount of hydrogen to be added depends upon the nature of initial material to be treated and on the nature of the desired products. For example, if it is desired to obtain products containing substantial proportions of aromatic hydrocarbons by treatment at the upper temperature range of the destructive hydrogenation, about from 300 to 500 liters of hydrogen are employed for each kilogram of initial oil; when operating in the liquid phase 1.5 cubic meters of hydrogen may be added to each kilogram of initial carbonaceous material, while when working in the gaseous or vaporous phase for the production of lower boiling hydrocarbons without substantial conversion into aromatic hydrocarbons each kilogram of initial oil may be treated with for example 2 cubic meters. It is, however, to be understood that the operation in the vaporized phase as well as that in the liquid phase may be effected also with the employment of larger amounts of hydrogen.

In case the catalyst is employed finely dispersed in the oil or paste of the solid carbonaceous material to be converted it is added to this oil or paste in an amount between 0.03 and 10 per cent of the amount of this oil or paste. If the conversion is to take place in the vaporized phase and the catalyst employed in the form of pieces arranged in the reaction vessel the oil is usually sprayed in in an amount per hour of from half to three times the amount of the catalyst.

The materials to be converted are preferably exposed for between 0.5 and 1 hour to the reaction conditions, but also higher or smaller periods of exposure may be employed.

The catalysts according to the present invention are considerably superior in activity to those whose active component (as for example molybdenum) is present in non-complex form, as for example in magnesium molybdate, $MgMoO_4$, or in simply complex form. Under the same conditions they give far greater yields of degradation products and the splitting reaction sets in at much lower temperatures so that the same or even a better effect is obtained at lower temperatures than is obtainable with the catalysts and under the temperature conditions hitherto employed; this constitutes a considerable advance in economy.

The special suitability of the said catalysts for the production of benzines from middle oils resides in the fact that they are capable even at comparatively low temperatures of yielding products containing large amounts of hydrocarbons boiling below 100° C., so that the whole of the benzines obtained may be directly employed as motor fuels. The catalysts are of particular advantage when working in the gaseous or vaporous phase, although good results are also obtained when working in the liquid phase.

Figure 2:
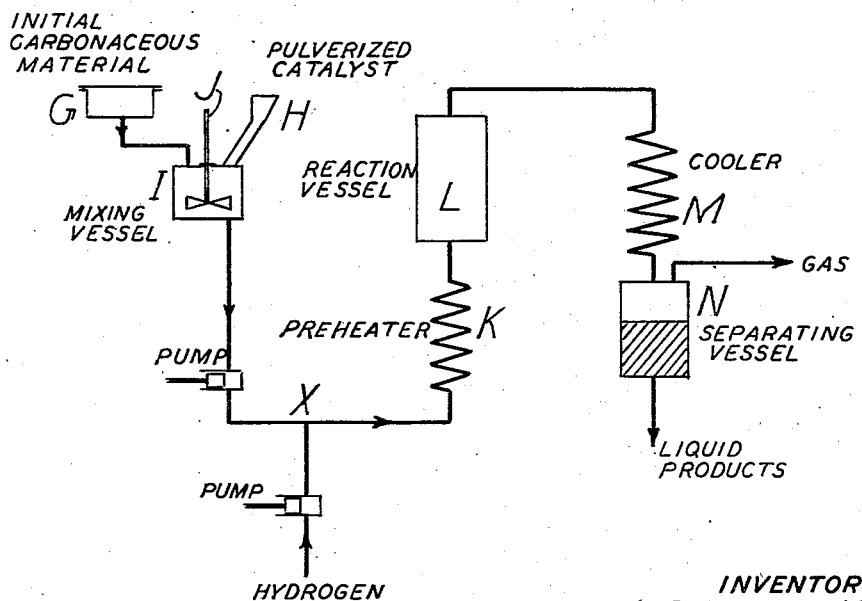

Suitable apparatus for carrying out our process is illustrated in the accompanying drawing in which Fig. 1 is a skeleton view of an apparatus for operating in the vapor phase and Fig. 2 is a skeleton view of an apparatus for operating in the liquid phase.

Referring to Fig. 1 in detail, the initial material is fed in the liquid state into pipe $b$ which conducts it to point $c$ where it joins pipe $a$ into which a stream of hydrogen is fed. The mixture of initial material and hydrogen passes through heat exchanger A, in which it is vaporized, then through pre-heater B into the reaction chamber C which contains pieces of catalyst. The products are conducted from chamber C back to exchanger A from which they are fed to cooling device D and thence to separating vessel E. From the separating vessel, the uncondensed gases are led off to pipe $d$ and the liquid products are drawn off through pipe $e$.

Referring to Fig. 2 in detail, the initial carbonaceous material is led from storage vessel G into mixing vessel I where it is intimately admixed with pulverized catalyst introduced from hopper H. J designates a stirrer. From the mixing vessel, the mixed initial material and catalyst is pumped through a pipe to the preheater K. Before reaching preheater K, it is mixed with hydrogen at $x$. The mixture of initial material, catalyst and hydrogen in the liquid phase is passed from the preheater K into the reaction vessel L from which the products of the reaction are conducted to the cooler M and thence to separating vessel N which is provided with separate conduits for leading off gases and liquid products.

The following examples will further illustrate the nature of this invention but the invention is not restricted to these examples. The parts are by weight.

*Example 1*

An insoluble ammonium polymolybdate prepared as described by Klasen (Berichte, 34, page 157) and assigned the formula $3NH_3.15MoO_3.6H_2O$ by Klasen is mixed with the same amount by weight of alumina hydrate (containing about 60 per cent of $Al_2O_3$) and stirred into a stiff paste with 30 per cent nitric acid. After drying at 100° C., the mass is slowly heated to 450° C., whereby the nitric acid is expelled. After cooling, the hard mass is comminuted and reduced in a high-pressure tube with hydrogen under a pressure of 200 atmospheres and at a temperature gradually rising to 450° C. If brown coal tar middle oil be sprayed in large amounts into the gas current at 420° C., a condensate is obtained by cooling the effluent gases which in addition to middle oil contains a benzine containing large amounts of hydrocarbons boiling below 100° C., the yield being such that the amount of benzine formed per hour is equal in volume to the catalyst.

If a catalyst is employed under the same conditions which is prepared by mixing molybdic acid, produced by precipitation at normal temperature by means of hydrochloric acid from a solution of ammonium molybdate of commerce, with one fifth of its weight of alumina and moulding by pressing, a considerably smaller yield of benzine is obtained. The condensate in this case only contains fractions of benzine character, in an amount corresponding to a yield of about half of the volume of the catalyst per hour and after a short time the yield decreases to about one third. Moreover, the said benzine fractions contain only 20 per cent by volume of products boiling below 100° C.

*Example 2*

An ammonium hexamolybdo-chromite, prepared according to Struve, Journ. f. prakt. Chemie 61 (1854), page 449 et seq., is made into a paste with an equal amount of alumina hydrate and a little nitric acid and introduced into moulds.

After reduction by means of hydrogen in a high-pressure vessel under a pressure of 200 atmospheres and at a temperature gradually raised to 450° C., brown coal tar middle oil is added at 430° C. to the current of hydrogen in such amounts that twice the volume of the catalyst of the said middle oil passes through the high pressure vessel per hour.

When the reaction gases are cooled a condensate is obtained of which from 50 to 70 per cent by volume boils below 180° C. Of these benzine hydrocarbons more than one third distils over below 100° C.

What we claim is:—

1. In the conversion of combustible distillable carbonaceous materials by catalytic destructive hydrogenation at a temperature between 300° and 700° C. and under a pressure above 20 atmospheres, the step of working with a catalyst comprising a compound selected from the group consisting of the isopoly acids and metallic complex acids of molybdenum and tungsten and the salts of the said acids.

2. In the conversion of combustible distillable carbonaceous materials by catalytic destructive hydrogenation at a temperature between 300° and 700° C. and under a pressure above 20 atmospheres, the step of working with a catalyst comprising a compound selected from the group consisting of the isopoly acids and metallic complex acids of molybednum and tungsten, and containing an addition of a basic nature at the most in such an amount that in the catalyst the acid component is stoichiometrically considerably predominant compared with the basic components.

3. In the conversion of combustible distillable carbonaceous materials by catalytic destructive hydrogenation at a temperature between 300° and 700° C. and under a pressure above 20 atmospheres, the step of working with a catalyst comprising a compound selected from the group consisting of the isopoly acids and metallic complex acids of molybdenum and tungsten and the salts of the said acids, and containing in addition thereto another non-reducible substance.

4. In the conversion of a liquid fuel by catalytic destructive hydrogenation at a temperature between 300° and 700° C. and under a pressure above 20 atmospheres, the step of working with a catalyst comprising a compound selected from the group consisting of the isopoly acids and metallic complex acids of molybdenum and tungsten and the salts of the said acids.

5. In the conversion of a liquid fuel by catalytic destructive hydrogenation in the vaporized phase at a temperature between 300° and 700° C. and under a pressure above 20 atmospheres, the step of working with a catalyst comprising a compound selected from the group consisting of the isopoly acids and metallic complex acids of molybdenum and tungsten and the salts of the said acids.

6. In the conversion of combustible distillable carbonaceous materials by catalytic destructive hydrogenation at a temperature between 300° and 700° C. and under a pressure above 20 atmospheres, the step of working with a catalyst comprising a compound selected from the group consisting of the isopoly acids and metallic complex acids of molybdenum and tungsten and the salts of the said acids, said catalyst being in a state substantially free from readily reducible compounds and metals forming such compounds.

PAUL HEROLD.
HERMANN KAUFMANN.